June 24, 1969  E. K. MAHLO  3,451,985
METHOD OF POLYMERIZING VINYL MONOMERS
Filed March 26, 1964
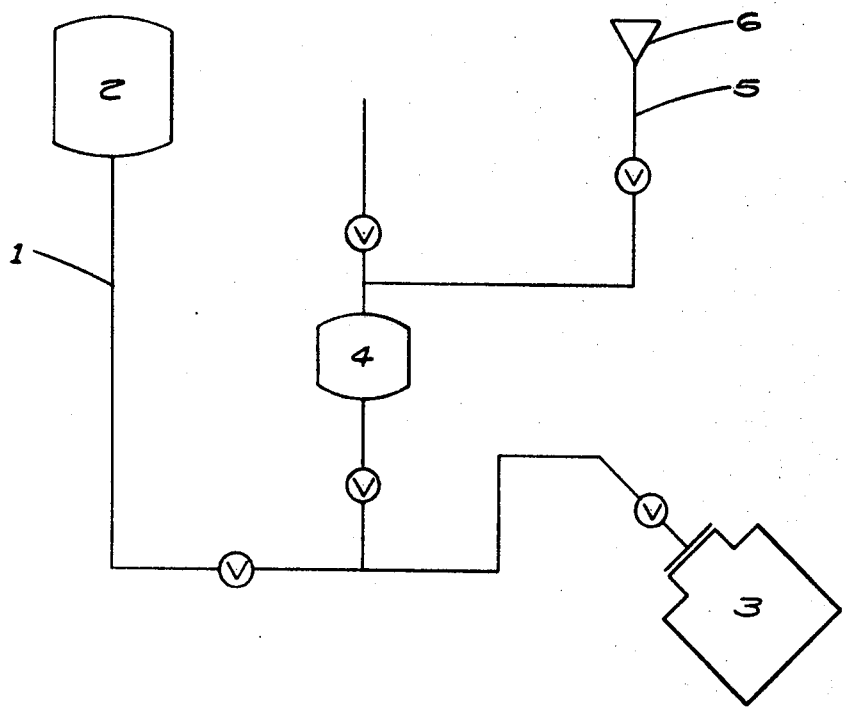
EDWIN K. MAHLO  INVENTOR.
BY *Paul C Sullivan*
ATTORNEY

United States Patent Office 3,451,985
Patented June 24, 1969

3,451,985
METHOD OF POLYMERIZING VINYL MONOMERS
Edwin K. Mahlo, East Longmeadow, Mass., assignor to Monsanto Company, St. Louis, Mo., a corporation of Delaware
Filed Mar. 26, 1964, Ser. No. 355,006
Int. Cl. C08f 1/60
U.S. Cl. 260—92.8                    8 Claims

ABSTRACT OF THE DISCLOSURE

The present invention provides a method of polymerizing vinyl-type monomers with highly efficient polymerization initiators, which are introduced into the monomer during polymerization in an aqueous medium. About 0.005 to 0.5 part, per 100 parts of monomer, of the polymerization initiator in an aqueous medium is introduced at a controlled rate into the reaction vessel so as to minimize problems in handling and utilizing various initiators which are highly active and often dangerous.

---

The present invention relates generally to a new and useful method of increasing the polymerization efficiency of vinyl-type polymerization reactions, and more specifically, to a method of increasing the product capacity of existing polymerization equipment while simultaneously eliminating many of the hazardous problems associated with fast polymerization initiators.

In recent years, several new types of polymerization initiators have been introduced for increasing the polymerization rate while using only minute amounts of polymerization initiator. One of the more useful types of polymerization initiators in this regard are the dialkyl peroxy dicarbonates, particularly diisopropyl peroxydicarbonate. This initiator and its use in vinyl-type polymerizations is more full described in U.S. 2,464,062. Although initiators of this type are extremely advantageous, it has been found that their use requires numerous safety precautions due to the hazards involved under some conditions of operation. For example, unusual conditions of heat, friction, or shock may cause severe explosions. In addition, when using the initiator in large amounts and at high temperatures, violent reactions can occur.

It has been suggested that these difficulties can be overcome by a polymerization process in which the peroxydicarbonate initiators are formed "in situ" while polymerizing a vinyl-type monomer as a separate monomer phase. This polymerization process, however, presents difficulties, particularly in regard to control of the concentration of the reactants. In addition, it has been found that the process has several disadvantages from a commercial point of view, due to the additional raw materials and controls required.

It has also been proposed to prepare vinyl-type polymerization products by a suspension polymerization process involving charging a minor amount of diisopropyl peroxydicarbonate as a single charge in admixture with stabilizing chemicals such as cyclohexane, xylene, etc. This process, however, also presents difficulties from a commercial point of view. It has been found that when using conventional feed systems for feeding catalysts of this type, friction is generated at various points in the metering system, e.g., in the pumps and moving parts, thereby creating a potential fire or explosion hazard. In addition, since much less initiator is required than that conventionally employed in polymerization reactions, the slow flow rate required causes plugging of the catalyst feed line and discharge nozzle due to polymerization of the monomer, initiated by residual catalyst in the line.

It has been found in accordance with the present invention that these deficiencies in the prior art methods of controlling catalyst feed are overcome while simultaneously providing for larger yields of polymer through the use of a lower initial water to monomer ratio at the beginning of the polymerization run.

It is therefore an object of the present invention to provide an improved process for introducing a fast polymerization initiator into a reaction vessel containing a polymerizable monomer of the vinyl-type by introducing a controlled stream of an aqueous medium containing small amounts of the initiator into the reaction vessel.

It is a further object of this invention to provide a method of introducing a dialkyl peroxydicarbonate initiator in a controlled stream of an aqueous medium at a volumetric flow rate substantially equivalent to the volume shrinkage within the reaction vessel.

It is a further object of this invention to provide a safe and commercially feasible method of producing vinyl-type polymers.

These and other objects of the invention will become apparent from the following description together with the accompanying figure which illustrates a preferred embodiment of the process.

Referring now to the accompanying drawing, there is shown a high pressure line 1 leading from an aqueous medium source 2 into a reactor 3, through which is fed a stream of an aqueous medium. An initiator charge tank 4, containing a fast polymerization initiator in solution, is positioned between the aqueous medium source and the reactor such that controlled amounts of initiator may be charged into the high pressure line either continuously or at predetermined intervals. It is preferable when using a peroxydicarbonate initiator to stabilize the initiator against decomposition by dissolving it in a suitable solvent, although the peroxydicarbonate catalyst may be used in its solid form if desired. It has been found that when using diisopropyl percarbonate as initiator crosslinkable solvents such as diethyl maleate which become an integral part of the polymer are most suitable in this regard, since the problem of removing the solvent from the polymers as an impurity is obviated. This is particularly advantageous when preparing polymers to be used in food containers or the like where stringent purity requirements must be met. The fast polymerization initiator is preferably fed to the aqueous medium by regulated fluid pressure such as nitrogen gas or water pressure, supplied for example, through feed line 5 by a cylinder 6. In this manner, the bulk of the catalyst is blanketed and under hydraulic pressure thereby eliminating mechanical friction from the system during addition to the reactor and further reducing the possibility of explosion. By feeding the catalyst to the reactor in an aqueous medium flowing at high pressure, the fluid will completely fill the line volume and prevent monomer from entering and plugging the feed system. In addition, by feeding the catalyst in dilute concentration, polymer build-up and plugging of the line caused by polymerization of the monomer at the point of injection to the reactor is eliminated.

The use of this system provides a further significant advantage over conventional feed systems since an aqueous medium is being constantly introduced during the polymerization cycle. In conventional suspension polymerization systems, using fast polymerization initiators, it has been found necessary to provide a high initial water to monomer ratio, in order to control within reasonable limits the exothermic heat of reaction and to maintain a viscosity sufficiently low to allow agitation of the slurry as polymerization progresses. By the use of the present system, the initial water to monomer ratio can be lowered, thereby permitting higher percentages of monomer in a given charge. For example, when polymerizing vinyl chloride in suspension, the initial water to monomer ratio will generally be between 1.4 and 2.0, yet by the use of the present system, it is possible to introduce charges having water to monomer ratios far below 1.4 As the polymerization cycle progresses, a constant stream of "flush water" entering with the catalyst and maintained throughout the entire run maintains the pseudo-viscosity of the slurry despite increasing polymer content, thereby allowing thorough and constant agitation. Since polymerization is accompanied by a gradual volume shrinkage within the reactor vessel, it is advantageous to adjust the rate of feed of the aqueous medium to a volumetric flow rate substantially equivalent to the volumetric shrinkage in the slurry. It can be readily seen that the use of this system will permit the production of substantially greater amounts of polymer in a reactor of any given capacity.

The following examples are presented to illustrate the novel features of the invention and are not intended to be limitations thereof. Unless otherwise indicated, all quantities mentioned are on a part by weight basis.

Example I 110 parts of preheated water, a solution of .08 part of hydroxypropyl methyl cellulose suspending agent, and .25 part of sorbitan monolaurate particle porosity modifier, are charged to a clean reactor which is then closed and vacuum boiled to remove oxygen. 100 parts of vinyl chloride monomer is charged under pressure and the mixture is adjusted to a temperature of 54° C. Water, under a pressure of 140 p.s.i., is fed through a high pressure line to the reactor at a rate of 4 parts per hour. A charge of .04 part of diisopropyl peroxydicarbonate initiator dissolved in diethyl maleate solvent (40 percent w./w.) is slowly fed to the high pressure line leading to the reactor over a period of twenty minues. Polymerization begins immediately and a constant batch temperature is maintained by jacket cooling to remove the exothermic heat of the reaction. Throughout the entire polymerization cycle, flush water is continuously added to the reactor. When the pressure in the reactor drops to a preassigned value, polymerization is interrupted by venting off unreacted monomer. At this time the water to vinyl chloride ratio is approximately 1.5 as compared to the initial water to vinyl chloride monomer ratio of 1.1. The resin slurry is then recovered, centrifuged, dried, and screened using conventional techniques.

Example II

Example I is repeated except that .05 part of diisopropyl peroxydicarbonate is fed into the diluent stream in its solid form.

Example III

Example II is repeated except that .06 part of acetyl cyclohexane persulfonate is used in place of diisopropyl peroxydicarbonate.

Example IV

Example I is repeated except that a charge of 100 parts of vinyl acetate are introduced into the reactor in place of vinyl chloride.

Example V

Example II is repeated except that 100 parts of styrene are introduced into the reactor in place of 100 parts of vinyl chloride.

Although this invention has been described in connection with dialkyl peroxydicarbonates and acyl persulfonate initiators such as those described in copending application Ser. No. 286,473 now Patent No. 3,340,243, this system finds equal use when employing other polymerization initiators wherein the problem of feeding small amounts of catalyst at controlled rates exists.

In addition, although this invention has been described in connection with suspension polymerization processes wherein a fast polymerization initiator is introduced as an aqueous phase, this same principle may find equal utility in emulsion or solution polymerization.

Obviously, conventional suspension stabilizers such as gelatin, cellulose ethers, etc., may be employed in conjunction with this invention, as well as conventional anionic and nonionic surface active agents, buffering agents, particle porosity modifiers, prestabilizers, etc.

The initiator concentration will vary depending upon the particular grades and types of polymers sought to be produced, however, it has been found that generally concentrations in the range of from about .005–.500 part of initiator per 100 parts of monomer are most advantageous when using diisopropyl peroxydicarbonate as initiator. It is preferable that the concentration be maintained between .01 and .08 part per 100 parts of vinyl monomer. Temperatures may range between 0° C. and 70° C., however, temperatures ranging between 50° C. and 60° C. have been found to be preferable.

The rate of addition of the aqueous medium containing the fast initiator to the reactor vessel will depend upon numerous factors, including the initial water to monomer ratio, vessel capacity, final water to monomer ratio desired, percent conversion desired, degree of agitation, etc. The optimum flow rate and line pressure may be readily determined empirically from a consideration of these and other factors. Generally, the flow rate of the aqueous medium may range between 1 to 30 parts per hour, depending upon the total time selected to admit the entire charge of catalyst and carrier. It is, of course, possible to admit the charge continuously or intermittently over any suitable time interval, or as a single charge. Typically, the time interval will range between 20 minutes and two hours, but may vary over a wide range, depending upon operating conditions.

The line pressure should at all times be sufficiently higher than the reactor pressure to insure positive flow. Reactor pressures may range between about 50 p.s.i. to 175 p.s.i. with optimum results being obtained at pressures of between 75 p.s.i. to 150 p.s.i.

Although water is generally preferred as a carrier medium for the initiator, other constituents may be included in the carrier medium if desired, such as chain regulators, e.g., alcohols, aldehydes, etc., suspending agents, etc.

As mentioned previously, the catalyst may be charged to the aqueous medium in its solid form, but is preferably used in admixture with a solvent such as diethyl maleate, cyclohexane, toluene, etc., in any proportions.

The method of this invention is applicable to those monomeric materials which contain a single methylene group attached to a carbon atom by a double bond; that is, compounds which contain a single $CH_2=C<$ group. Among such monomers are the vinyl aromatics, such as styrene, p-chlorostyrene; esters of alpha-methylene aliphatic monocarboxylic acids, such as methyl acrylate, ethyl acrylate, n-butyl acrylate, isobutyl acrylate, dodecyl acrylate, 2-chloroethyl, 2-chloropropyl acrylate, 2-2′dichloroisopropyl acrylate, phenyl acrylate, cyclohexyl acrylate, methyl alpha-chloroacrylate, methyl methacrylate, ethyl methacrylate, methyl ethacrylate; acrylonitrile; methacrylonitrile; acrylamide; vinyl esters, such as vinyl acetate, vinyl propionate, vinyl chloroacetate, vinyl butyrate; vinyl halides, such as vinyl chloride or vinyl bromide; vinyl ethers, such as vinyl methyl ether, vinyl isobutyl ether, vinyl 2-chloroethyl ether; vinyl ketones, such as vinyl methyl ketone, vinyl hexyl ketone, methyl isopropenyl ketone; isobutylene; vinylidene halides, such as vinylidene chloride, vinylidene chlorofluoride; N-vinyl compounds, such as N-vinyl pyrrole, N-vinyl carbazole, N-vinyl indole, N-vinyl succinimide; and other similar polymerizable materials. The method of this invention is also applicable to the copolymerization of mixtures of two or more of these monomeric materials. Vinyl chloride has been found to be particularly useful in the system of this invention.

Any of the other ethylenically unsaturated monomers mentioned previously which are to be copolymerized therewith may be added initially with the vinyl chloride, added later during polymerization or slowly bled into the system during polymerization. Additionally, part of the vinyl chloride may be withheld initially and charged as polymerization progresses. The reaction products are isolated by conventional means, the details of which depend on the particular polymerization technique employed.

While in the foregoing specification specific compositions and procedures have been set out in considerable detail for the purpose of illustrating the invention, it will be understood that such details may be varied widely by those skilled in the art without departing from the spirit of this invention.

What is claimed is:

1. In the method of polymerizing a vinyl halide monomer formulation using highly active polymerization initiators in a reaction vessel, the improvement comprising adding to an aqueous medium about 0.005–0.5 part per 100 parts of said monomer formulation of a polymerization initiator selected from the group consisting of dialkyl peroxydicarbonates and acyl persulfonates; and thereafter admixing said initiator with said monomer formulation by introducing a stream of said medium containing said initiator into said reaction vessel containing said monomer formulation at a controlled rate over a time period of at least 20 minutes during polymerization of said monomer formulation, said initiator being added to said aqueous medium under inert fluid pressure to eliminate mechanical friction from the system transporting the initiator and aqueous dispersion thereof and to enhance the safety of the reaction.

2. A method according to claim 1 wherein said aqueous medium is introduced at a volumetric flow rate substantially equivalent to the rate of volume shrinkage within said reaction vessel.

3. A method according to claim 1 wherein said polymerization initiator is a dialkyl peroxy dicarbonate.

4. A method according to claim 1 wherein said polymerizable monomer is vinyl chloride.

5. A method according to claim 3 wherein said dialkyl peroxy dicarbonate is added to said aqueous medium as a solution in diethyl maleate.

6. A method according to claim 1 wherein said fast polymerization initiator is an acyl persulfonate.

7. A method according to claim 1 wherein said reaction vessel is maintained under a pressure of 50 p.s.i. to 175 p.s.i., and said stream of aqueous medium and initiator is introduced at a rate of 1 to 30 parts per hour.

8. A method according to claim 1 wherein said monomer formulation is an aqueous suspension, said reaction vessel is maintained under a pressure of 50 p.s.i. to 175 p.s.i., and wherein polymerization of the suspension is continued until the water to monomer plus polymer ratio becomes between 1.4 and 2.0.

References Cited

UNITED STATES PATENTS

| 3,022,282 | 2/1962 | Marous et al. | 260—92.8 |
| 2,975,162 | 3/1961 | Iloff | 260—92.8 |

FOREIGN PATENTS

| 449,804 | 7/1948 | Canada. |
| 604,580 | 7/1948 | Great Britain. |

OTHER REFERENCES

Diisopropyl Peroxydicarbonate, Columbia-Southern Technical Bulletin, p. 3, 1959.

JOSEPH L. SCHOFER, *Primary Examiner.*

JOHN A. DONOHUE, JR., *Assistant Examiner.*

U.S. Cl. X.R.

260—78.5, 80, 88.7, 89.1, 89.5, 89.7, 91.1, 91.5, 63, 92.1, 93.7